(12) United States Patent
Cassady

(10) Patent No.: US 11,585,985 B2
(45) Date of Patent: Feb. 21, 2023

(54) ALIGNMENT GUIDE FOR INSPECTING A FIBER OPTIC END FACE

(71) Applicant: VIAVI Solutions Inc., San Jose, CA (US)

(72) Inventor: Kevin Cassady, Monroe, WA (US)

(73) Assignee: VIAVI Solutions Inc., Chandler, AZ (US)

(*) Notice: Subject to any disclaimer, the term of this patent is extended or adjusted under 35 U.S.C. 154(b) by 0 days.

(21) Appl. No.: 17/305,902

(22) Filed: Jul. 16, 2021

(65) Prior Publication Data
US 2021/0341677 A1 Nov. 4, 2021

Related U.S. Application Data

(62) Division of application No. 16/425,319, filed on May 29, 2019, now Pat. No. 11,086,080.

(51) Int. Cl.
*G02B 6/36* (2006.01)
*G02B 6/38* (2006.01)

(52) U.S. Cl.
CPC ............ *G02B 6/3624* (2013.01); *G02B 6/385* (2013.01); *G02B 6/3825* (2013.01); *G02B 6/3885* (2013.01)

(58) Field of Classification Search
CPC .. G02B 6/385; G02B 21/0016; G02B 6/3624; G02B 6/3825; G02B 6/3885; G02B 6/3878; G01M 11/30; G01M 11/31; G01M 11/33
See application file for complete search history.

(56) References Cited

U.S. PATENT DOCUMENTS

| | | | |
|---|---|---|---|
| 2007/0014526 A1* | 1/2007 | Lazo | G01M 11/33 385/89 |
| 2011/0085159 A1 | 4/2011 | Levin et al. | |
| 2014/0063598 A1* | 3/2014 | Zhou | G02B 6/385 359/368 |
| 2015/0092043 A1* | 4/2015 | Baribault | H04N 5/2252 348/125 |
| 2016/0170151 A1* | 6/2016 | Baribault | G02B 6/381 356/73.1 |
| 2017/0003195 A1* | 1/2017 | Lafrance | G02B 6/3885 |
| 2020/0379186 A1 | 12/2020 | Cassady | |

FOREIGN PATENT DOCUMENTS

| | | | | |
|---|---|---|---|---|
| EP | 3096124 A1 * | 11/2016 | | G01M 11/31 |
| EP | 4006601 A1 * | 6/2022 | | G01M 11/31 |

* cited by examiner

*Primary Examiner* — Ryan A Lepisto
*Assistant Examiner* — Erin D Chiem
(74) *Attorney, Agent, or Firm* — Harrity & Harrity, LLP

(57) ABSTRACT

An optical fiber inspection system may include an alignment guide having a sleeve portion and a mechanical key structure. The sleeve portion may comprise a first opening arranged to be proximal to one or more optical components in an inspection device and a second opening arranged to be distal to the one or more optical components when the alignment guide is removably engaged with the inspection device. The mechanical key structure may be located adjacent to the second opening and have a shape to engage a geometry of one or more recesses in a bulkhead. Accordingly, the alignment guide may stabilize the inspection device at a particular angle relative to an end face of an object in a field of view of the one or more optical components when a shaft of the inspection device is inserted into the bulkhead.

20 Claims, 8 Drawing Sheets

320
ALIGNMENT GUIDE ROTATED
TO ALTERNATE POSITION

310
ALIGNMENT GUIDE ENGAGES BULKHEAD
GEOMETRY TO STABILIZE IMAGE AND SET A
SUITABLE OPTICAL OFFSET ANGLE

ALIGNMENT GUIDE FOR INSPECTING A FIBER OPTIC END FACE

RELATED APPLICATION

This application is a division of U.S. patent application Ser. No. 16/425,319, filed May 29, 2019, which is incorporated herein by reference in its entirety.

BACKGROUND

A microscope may include an instrument used to see objects that are too small to be seen by the naked eye. Microscopy may include investigating small objects and structures using a microscope. A microscope may include an optical microscope, which uses light passed through a sample to produce an image, a fluorescence microscope, an electron microscope, a scanning probe microscope, and/or the like. In some cases, a microscope may be used to analyze optical fibers of an optical cable.

SUMMARY

According to some implementations, an optical fiber inspection system may include an inspection device and an alignment guide. The inspection device may include a housing containing one or more optical components to capture an image of an end face of an optical fiber in a field of view of the one or more optical components and a shaft, integrated with the housing, arranged to be inserted into a bulkhead connected to the optical fiber. The shaft may provide an optical path from the one or more optical components to the end face of the optical fiber. The alignment guide may include a sleeve portion comprising a first opening on a first end of the sleeve portion that is proximal to the one or more optical components and a second opening on a second end of the sleeve portion that is distal to the one or more optical components. The alignment guide may include a mechanical key structure adjacent to the second opening on the second end of the sleeve portion that is distal to the one or more optical components. The mechanical key structure may have a shape to engage a geometry of the bulkhead and stabilize the inspection device at a particular angle relative to the end face of the optical fiber while the shaft is inserted into the bulkhead.

According to some implementations, a device may include a sleeve portion comprising a first opening on a first end of the sleeve portion and a second opening on a second end of the sleeve portion. The first opening may be arranged to be proximal to one or more optical components in an inspection device and the second opening may be arranged to be distal to the one or more optical components in the inspection device when the device is removably engaged with the inspection device. The device may include a mechanical key structure adjacent to the second opening, wherein the mechanical key structure may have a shape to engage a geometry of one or more recesses in a bulkhead, and to stabilize the inspection device at a particular angle relative to an end face of an object in a field of view of the one or more optical components when a shaft of the inspection device is inserted into the bulkhead.

According to some implementations, an optical fiber inspection system may include an inspection device, a microscope, and an alignment guide. The inspection device may comprise one or more optical components to capture an image of an end face of an optical fiber positioned in a bulkhead within a field of view of the one or more optical components. The microscope may be arranged to interface with the one or more optical components in the inspection device and to process the image of the end face of the optical fiber. The alignment guide may include a sleeve portion comprising a first opening and a second opening used to insert a shaft of the inspection device through the sleeve portion. The alignment guide may include a mechanical key structure, integrated with the sleeve portion, that may have a shape to engage a geometry of the bulkhead and stabilize the inspection device at an imaging axis offset angle relative to the end face of the optical fiber while the end face of the optical fiber is visible within the field of view of the one or more optical components.

DETAILED DESCRIPTION

Figure 1A:
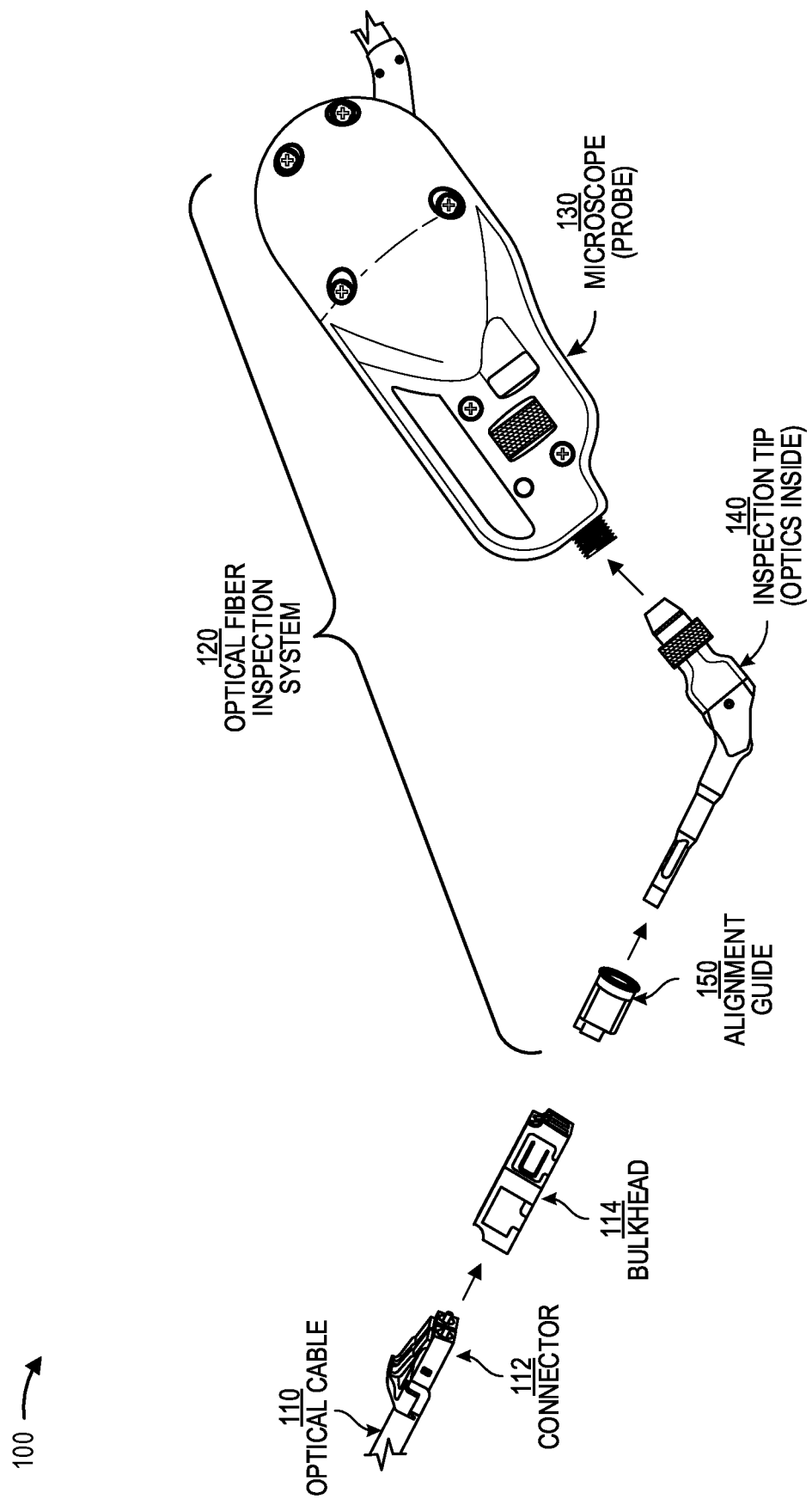
FIGS. 1A-1D are diagrams of one or more example implementations described herein.

The following detailed description of example implementations refers to the accompanying drawings. The same reference numbers in different drawings may identify the same or similar elements.

A technician may use a device, such as a handheld optical fiber microscope, to inspect an end face of an optical fiber of an optical cable prior to connecting the optical cable to network equipment. For example, the optical fiber may be placed in a field of view of the device, and the device may capture images, live video, and/or the like, of an end face of the optical fiber so that the device (and/or another device) may analyze the images for dirt particles, dust particles, scratches, and/or other surface defects. The device may need to capture a high-quality image of the end face of the optical fiber in order to perform an accurate analysis of the end face. For example, in order to enable an accurate analysis of the end face, the end face should be centered and in focus in the image, and there should be sufficient lighting to ensure that any dirt particles, dust particles, scratches, fingerprints, debris, and/or other surface defects are able to be detected when the image of the end face is analyzed.

In some cases, capturing a sufficiently high-quality image may be difficult because the end face of the optical fiber may be placed in a location that is difficult or awkward to reach. For example, the optical fiber is typically enclosed in a fiber optic cable, which may include a connector to terminate the fiber optic cable. The connector may be inserted or otherwise attached to another device, such as a bulkhead in a fiber optic enclosure, patch panel, or other fixture that acts as a termination unit to organize and distribute fiber optic cables and branches, terminate cable elements, provide a secure organized chamber to house connectors and splice units, and/or the like. Accordingly, in order to capture the high-quality image, the handheld optical fiber microscope may include or otherwise interface with an inspection tip (e.g., a stainless-steel tube that houses one or more optical components) that is placed into the bulkhead.

In general, a positioning of the inspection tip laterally and axially relative to the end face of the optical fiber being inspected should be as close to perpendicular as possible to obtain the sufficiently high-quality image. However, there tends to be a substantial amount of play, allowance, space, and/or the like between the inspection tip and the bulkhead, which creates instability in the image of the end face being inspected. For example, due to the space between the inspection tip and the bulkhead, the technician operating the handheld optical fiber microscope may have a difficult time stabilizing the inspection tip at the correct angle, and may thus have a difficult time capturing an image that is in focus and centered on the end face to be inspected with sufficient lighting to ensure that any dirt, scratches, debris, and/or the like that are present on the end face will be visible in the captured image.

Some implementations described herein relate to an alignment guide that can be placed on an inspection tip that interfaces with a microscope used to analyze an image of an end face of an optical fiber. The alignment guide may act as a mechanical guide for the inspection tip, allowing a technician or other user to easily position and stabilize the inspection tip at a position (e.g., an angle) relative to the end face from which a high-quality image can be captured. For example, the alignment guide may include a mechanical key structure that has a shape to establish a high-quality registration between mechanics of the inspection tip and a geometry of the bulkhead and to stabilize the inspection tip at the correct orientation (e.g., relative to the bulkhead and the end face visible in the bulkhead). Furthermore, in some implementations, the alignment guide can rotate freely around a substantially cylindrical surface of the inspection tip in order to move the alignment guide between different positions where the alignment guide engages or otherwise provides a mechanical registration with the inspection tip (e.g., a flattened portion of the substantially cylindrical surface). Furthermore, the alignment guide may be removable from the inspection tip, which may allow the alignment guide to be replaced with another alignment guide that has a mechanical key structure with a different shape (e.g., when using the inspection tip in a bulkhead associated with a different connector type).

In this way, the alignment guide enables the technician or other user to quickly and easily position the inspection tip at an optimal orientation relative to the end face of the optical fiber and maintain the inspection tip at the optimal orientation without dependence on a skill of the technician or user. In this way, computing resources (e.g., processing resources, memory resources, and/or the like) used to capture, store, view, analyze, and/or otherwise use images of end faces to be inspected are conserved because a probability of the technician or user capturing an unfocused image, an uncentered image, a poorly lighted image, and/or the like is reduced. In addition, because the alignment guide is rotatable between different positions to accommodate different positionings, configurations, and/or the like in which bulkheads are arranged, and removable to allow the alignment guide to be swapped out for different bulkheads that may have different geometries, an efficiency of analyzing multiple optical cables with different polishes, different optical connectors, and/or the like is improved. This may further improve a throughput of a technician with regard to a quantity of optical cables (of potentially different configurations) that the technician can inspect within a period of time, and/or the like.

FIGS. 1A-1D are diagrams of one or more example implementations 100 described herein. As shown in FIG. 1A, example implementation(s) 100 may include an optical cable 110 that includes one or more optical fibers, and an optical connector 112 that is attached to the optical cable 110. The optical fiber may be mounted in an interstitial material within the optical connector 112 connected to the optical cable 110. For example, the optical cable 110 may include a ferrule made from metal, ceramic, high-quality plastic, and/or the like, and the ferrule may have a hollowed-out center that forms a tight grip on the optical fiber. Furthermore, the optical connector 112 may include a connector body, which is usually constructed from metal or plastic, and the connector body may provide a structure to hold the ferrule and attach to a jacket of the optical cable 110 to strengthen members of the optical cable 110. In general, there are various configurations that can be used for the optical connector 112. For example, the optical connector 112 may be an LC connector often used in high-density applications, an SC connector that offers high performance, an FC connector with a round screw-type fitment suitable for use in high-vibration environments, an ST connector with a bayonet fitment, an MTP or MPO connector that can house multiple (e.g., up to 24) optical fibers in a single ferrule, and/or the like.

In some implementations, the optical connector 112 may further include a coupling mechanism that is used to hold the optical connector 112 in place when attached to another device, such as a bulkhead 114. As noted above, there are various configurations and/or connector types that can be used for the optical connector 112, and the various configurations and/or connector types may have fitments with different types and/or shapes (e.g., latch clips, screw-on fitments, bayonet fitments, and/or the like). Accordingly, the bulkhead 114 may have a geometry that is designed to mate with the coupling mechanism of the optical connector 112, whereby physical characteristics of the bulkhead 114 (e.g., shape, size, pattern, and/or the like) may vary depending on the type of the optical connector 112 to be attached to the bulkhead 114.

As further shown in FIG. 1A, example implementation(s) 100 includes an optical fiber inspection system 120, which may include a microscope 130 (e.g., a video microscope or probe), an inspection tip 140 that has one or more optical components housed therein, and an alignment guide 150 that has a shape to mate, interface, register, or otherwise engage with mechanics of the inspection tip 140 and the bulkhead 114, as described in further detail elsewhere herein.

In some implementations, the microscope 130 may include one or more components to analyze an image of an end face of the optical fiber enclosed in the optical cable 110 when the optical connector 112 is inserted into the bulkhead 114. For example, the inspection tip 140 may be placed into one end of the bulkhead 114 to inspect the end face of the optical fiber when the optical connector 112 is inserted into an opposite end of the bulkhead 114. As mentioned above, the inspection tip 140 may include one or more optical components (e.g., lenses, mirrors, filters, polarizers, and/or the like) that enable the microscope 130 to obtain (e.g., capture) one or more images of the end face of the optical fiber and/or to analyze the end face of the optical fiber when the optical connector 112 and the inspection tip 140 are inserted into opposite sides of the bulkhead 114. However, as mentioned above, there may be a substantial amount of play, allowance, space, and/or the like between the inspection tip 140 and the bulkhead 114, which may lead to instability in the image of the end face being inspected. Accordingly, the alignment guide 150 may be structured to establish a high-quality registration between a mechanical structure of the inspection tip 140 and the geometry of the bulkhead 114, which may allow a user to position the inspection tip 140 in an orientation that enables the microscope 130 to obtain a high-quality image of the end face of the optical fiber.

Figure 1B:
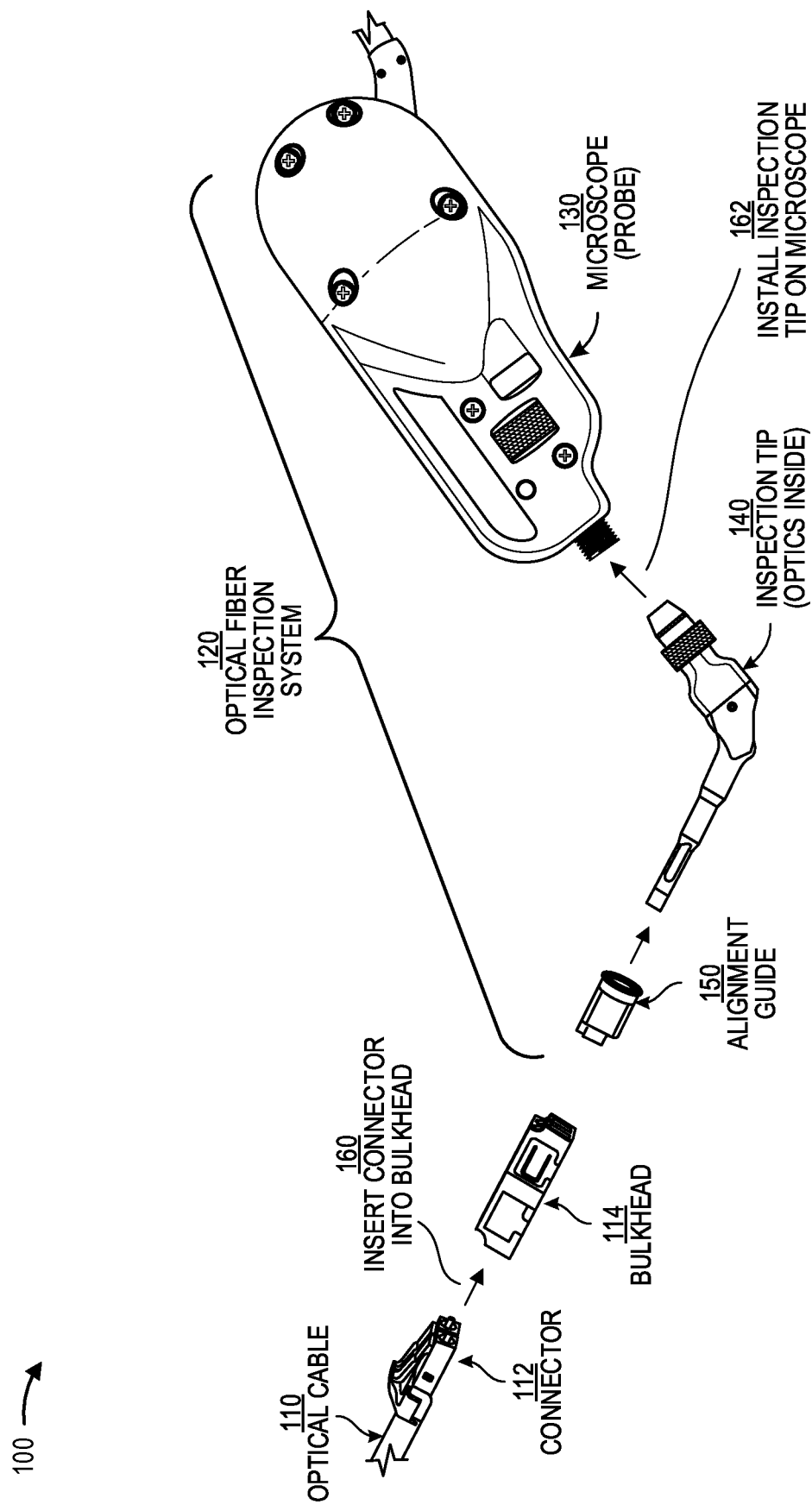

For example, as shown in FIG. 1B, and by reference number 160, the optical connector 112 may be inserted into the bulkhead 114. For example, depending on the type of the optical connector 112, the optical connector 112 may snap into or otherwise mate with a geometry of the bulkhead 114. As further shown in FIG. 1B, and by reference number 162, the inspection tip 140 may be installed on the microscope 130. For example, in some implementations, the inspection tip 140 may screw onto the microscope 130 or otherwise interface with the microscope 130. Accordingly, once the optical connector 112 has been inserted into the bulkhead 114 and the inspection tip 140 has been installed onto the microscope 130, the various components in implementation(s) 100 may be arranged as shown in FIG. 1C.

Figure 1C:
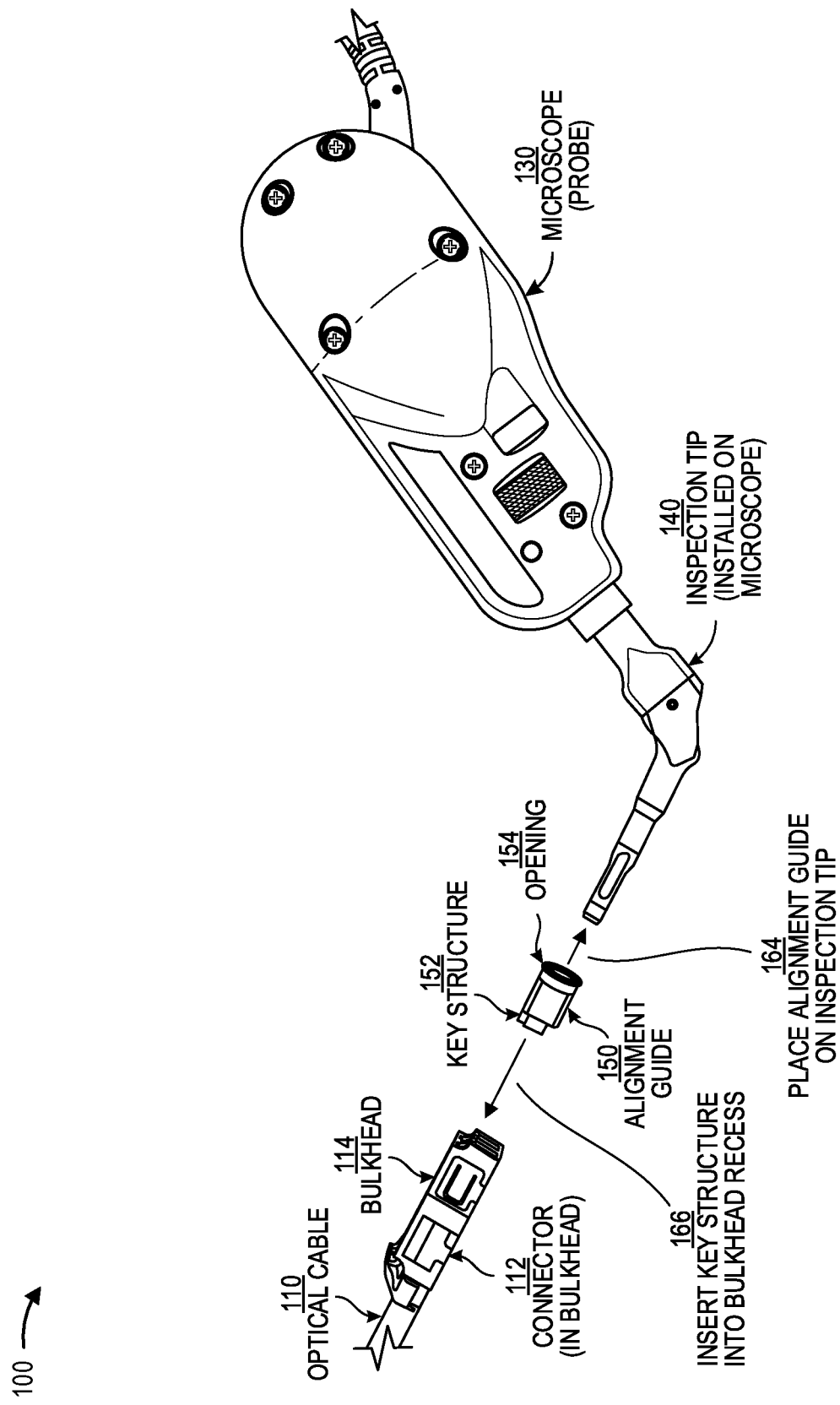

As further shown in FIG. 1C, the alignment guide 150 includes a mechanical key structure 152 that has a shape to engage a geometry of the bulkhead 114 and stabilize the inspection tip 140 at a particular angle relative to the end face of the optical fiber while the inspection tip 140 is inserted into the bulkhead 114. Furthermore, as shown in FIG. 1C, the alignment guide 150 includes a sleeve portion with an opening 154 used to pass the inspection tip 140 through the alignment guide 150. Accordingly, as shown in FIG. 1C, and by reference number 164, the alignment guide 150 may be placed on the inspection tip 140 via the opening 154. As further shown in FIG. 1C, and by reference number 166, the mechanical key structure 152 may be inserted into one or more recesses of the bulkhead 114 to secure and stabilize the inspection tip 140 at a particular angle that is suitable for capturing a high-quality image of the end face of the optical fiber.

Figure 1D:
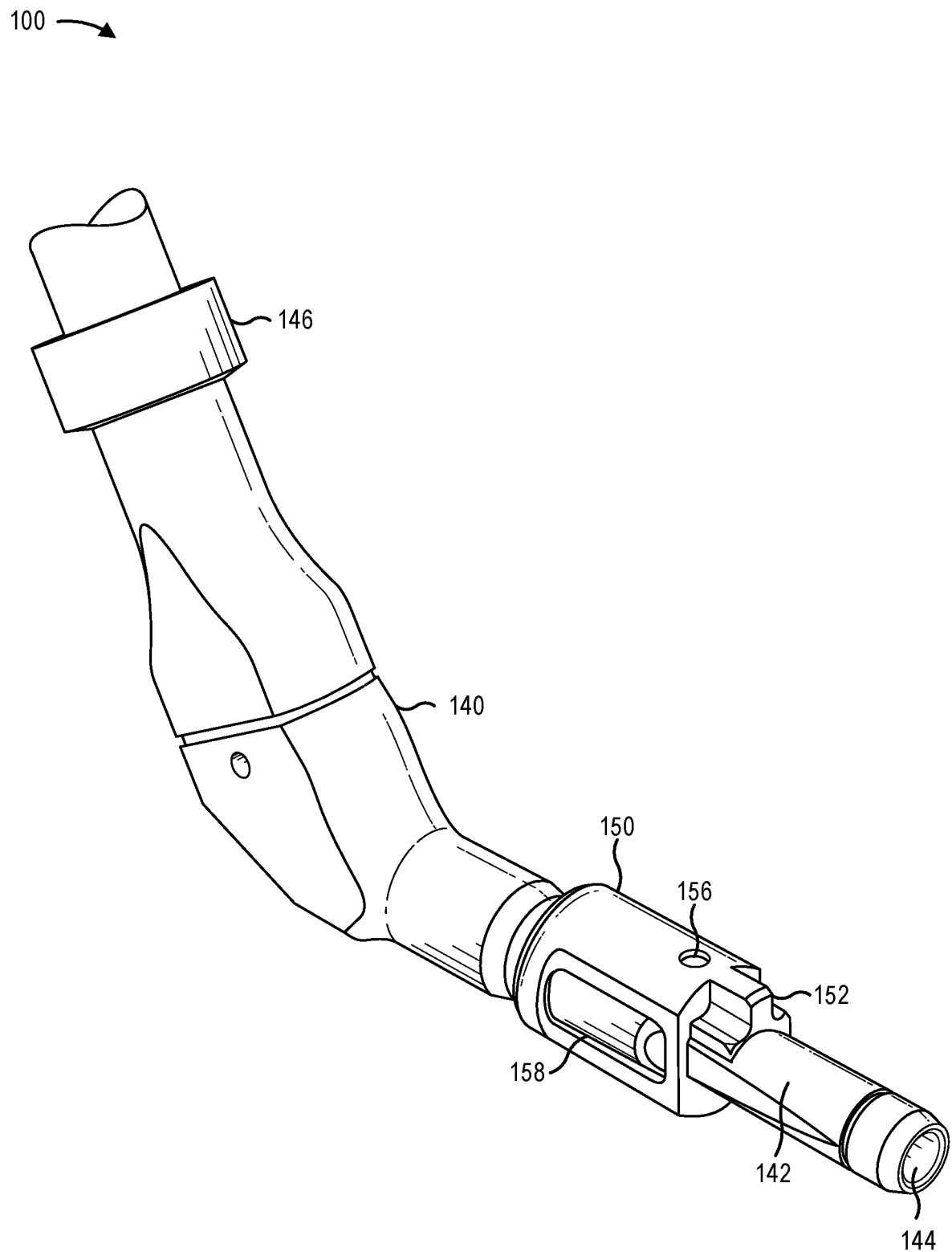

For example, FIG. 1D illustrates a resulting arrangement after the alignment guide 150 has been placed onto the inspection tip 140. As shown, the inspection tip 140 includes a housing that contains the one or more optical components and a shaft 142 that is integrated with the housing and arranged to be inserted into the bulkhead 114 connected to the optical fiber. The shaft 142, which may have a cylindrical shape as shown in the illustrated example, includes an opening 144 that provides an optical path from the one or more optical components to the end face of the optical fiber. Furthermore, as shown in FIG. 1D, the inspection tip 140 includes an interface 146 for connecting the inspection tip 140 to the microscope 130.

As further shown in FIG. 1D, the alignment guide 150 includes a sleeve portion with openings on either end to allow the alignment guide 150 be placed onto the inspection tip 140 (e.g., by passing the shaft 142 through the sleeve portion). In some implementations, the mechanical key structure 152 of the alignment guide 150 may be located adjacent to the opening of the sleeve portion that is distal to the one or more optical components. Furthermore, as shown, the mechanical key structure 152 has a shape to engage a geometry of the bulkhead 114 and stabilize the inspection tip 140 at a particular angle relative to the end face of the optical fiber while the shaft 142 is inserted into the bulkhead 114.

In some implementations, the alignment guide 150 may be rotated about an axis of the inspection tip 140 (e.g., up to 180 degrees) to enable a technician or other user to hold the microscope 130 at a particular angle relative to the end face of the optical fiber being inspected. For example, there may be multiple positions for the alignment guide 150 that can establish the particular angle, and the shaft 142 may include one or more flattened portions or other machined portions that allow the alignment guide 150 to be rotated along the axis of the inspection tip 140. Accordingly, the alignment guide 150 can be rotated around the shaft 142 and the mechanical key structure 152 may be shaped to engage or otherwise interface with the flattened or machined portions to hold the alignment guide 150 (and thus the inspection tip 140) at the particular angle at which a sufficiently high-quality image can be obtained. In this way, the alignment guide 150 can be rotated between different positions where the angle will position the optical components in the inspection tip 140 at a suitable orientation to obtain a high-quality (e.g., focused, centered, and well-lit) image of the end face being inspected.

In some implementations, as further shown in FIG. 1D, the alignment guide 150 may include a visual indicator 156 to aid the technician or user in aligning the shape of the mechanical key structure 152 with the geometry of the recesses in the bulkhead 114. For example, as shown in FIG. 1D, the visual indicator 156 may be structured as a depression formed in the sleeve portion of the alignment guide 150 adjacent to or in close proximity to a portion of the mechanical key structure 152 to be inserted into the bulkhead 114. Additionally, or alternatively, the visual indicator 156 may be another visual element, such as a reflector, a visual feature painted on the alignment guide 150, and/or the like. In this way, the visual indicator 156 may help the technician or user to quickly and easily align the mechanical key structure 152 with the bulkhead 114, which improves throughput and/or efficiency of the technician or user.

In some implementations, as further shown in FIG. 1D, the alignment guide 150 includes a relief element 158 on a side of the sleeve portion. For example, the optical fiber inspection system 120 that includes the microscope 130, the inspection tip 140, and the alignment guide 150 may be used to inspect fiber end faces in environments where there is another connector adjacent to the bulkhead 114 in which the inspection tip 140 is inserted. Accordingly, the relief element 158 may provide clearance to avoid impacting or otherwise contacting one or more objects that may be connected to or otherwise in proximity to the adjacent connector. In this way, the relief element 158 may avoid damage to fiber optic equipment in tight spaces, allow multiple inspection tips 140 and alignment guides 150 to be used to simultaneously inspect end faces in adjacent bulkheads 114, and/or the like.

In some implementations, the alignment guide 150 may be made from one or more thermoplastic materials that are durable and stable yet relatively soft to avoid damaging the bulkhead 114, the inspection tip 140, and/or other sensitive fiber optic equipment despite a tight fit. For example, in some implementations, the alignment guide 150 may be constructed from a polycarbonate material, an acrylonitrile butadiene styrene (ABS) material, an acrylonitrile styrene acrylate (ASA) material, a polycarbonate-ABS blend, and/or the like. In this way, the alignment guide 150 may exhibit high impact resistance, mechanical toughness, durability, deformation without cracking or breaking, and/or the like. Furthermore, because the thermoplastic materials can tolerate some deformation and/or bending, using the thermoplastic materials to form the alignment guide 150 may enable a high-quality registration between the alignment guide 150, the inspection tip 140, and the bulkhead 114 without causing damage to the bulkhead 114, the inspection tip 140, and/or other sensitive fiber optic equipment.

In some implementations, as shown in FIG. 1D, the mechanical key structure 152 has a shape that is designed to mate with the bulkhead 114 when the bulkhead 114 has a geometry to accept an LC-type connector. However, the mechanical key structure 152 can have a different shape to mate with the geometry of bulkheads 114 that are designed for other connector types (e.g., SC connectors, FC connectors, ST connectors, MTP or MPO connectors, and/or the like). Accordingly, the alignment guide 150 may be easily removable from the inspection tip 140, which may allow for the alignment guide 150 to be removed and replaced with another alignment guide 150 to be mated with the geometry of the particular bulkhead 114. For example, the technician or user may have a set of alignment guides 150 that have differently shaped mechanical key structures 152, and the technician or user may choose the particular alignment guide 150 to be used depending on the particular geometry of the bulkhead 114.

As indicated above, FIGS. 1A-1D are provided merely as one or more examples. Other examples may differ from what is described with regard to FIGS. 1A-1D. In practice, there may be additional components, fewer components, different components, or differently arranged components than those shown in FIGS. 1A-1D.

Figure 2A:
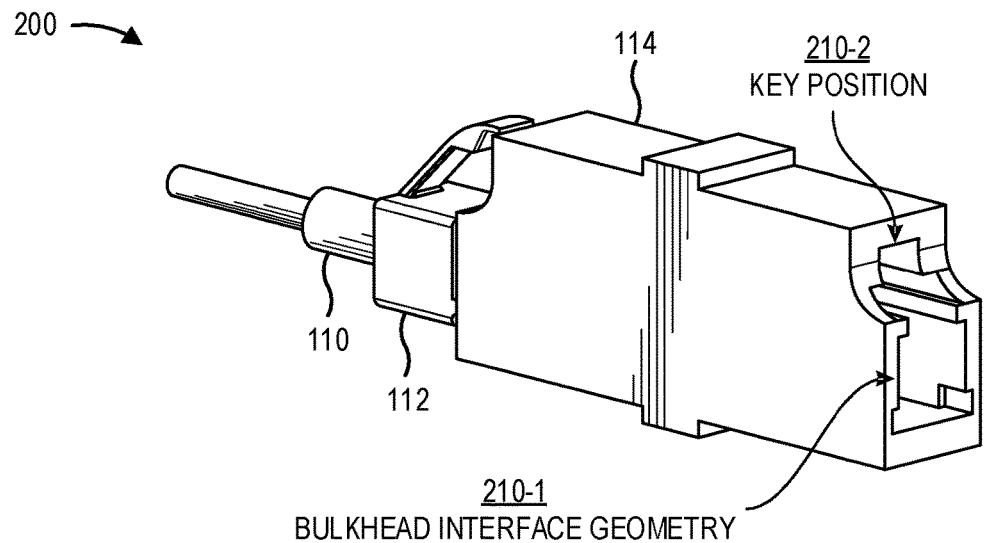
FIGS. 2A-2D are diagrams of one or more example bulkhead configurations related to an alignment guide to be used in an optical fiber inspection system described herein.

FIGS. 2A-2D are diagrams of one or more example bulkhead configurations 200 related to an alignment guide to be used in an optical fiber inspection system described herein. For example, FIGS. 2A-2D generally illustrate various perspectives of an arrangement in which the optical connector 112 attached to the optical cable 110 is inserted into the bulkhead 114, and the inspection tip 140 is to be inserted into an opposite end of the bulkhead 114 to inspect an end face of the optical connector 112, the optical cable 110, an optical fiber carried in the optical cable 110, and/or the like. For example, as shown in FIG. 2A, and by reference number 210-1, the bulkhead 114 has a particular interface geometry that is shaped to mate with the mechanical key structure 152 of the alignment guide 150 as shown in FIG. 1D. Furthermore, as shown in FIG. 2A, and by reference number 210-2, a key of the bulkhead 114 is located in a consistent position relative to a polish angle that satisfies a threshold value (e.g., a polish angle that falls within a range where there is likely to be sufficient lighting to obtain a high-quality image).

Figure 2B:
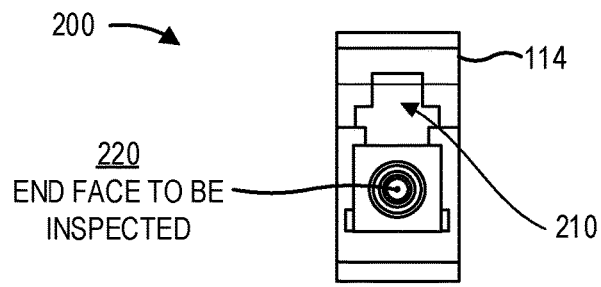

FIG. 2B depicts another perspective of the bulkhead geometry to be mated or otherwise engaged by the mechanical key structure 152 of the alignment guide 150. For example, as shown, the bulkhead geometry 210 has a shape that substantially matches the shape of the mechanical key structure 152, ensuring that the inspection tip 140 is stabilized at a polish angle where there is likely to be sufficient lighting to obtain a high-quality image. As further shown in FIG. 2B, and by reference number 220, an end face to be inspected is exposed inside the bulkhead 114, whereby the opening 144 in the shaft 142 of the inspection tip 140 may be placed near or around the end face to be inspected, providing an optical path from the optical components in the inspection tip 140 and/or the microscope 130 to the end face.

Figure 2C:
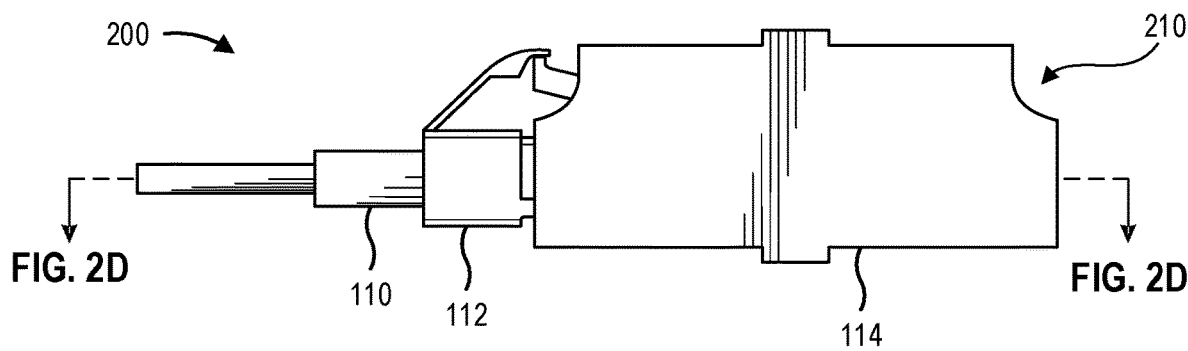

FIG. 2C depicts another (side view) perspective of the bulkhead 114 with the optical connector 112 inserted therein. As shown in FIG. 2C, and by reference number 210, the mechanical key structure 152 of the alignment guide 150 may be inserted into the interface of the bulkhead 114 while the alignment guide 150 is placed on the inspection tip 140 to stabilize the inspection tip 140 at a suitable angle relative to the end face to be inspected.

Figure 2D:
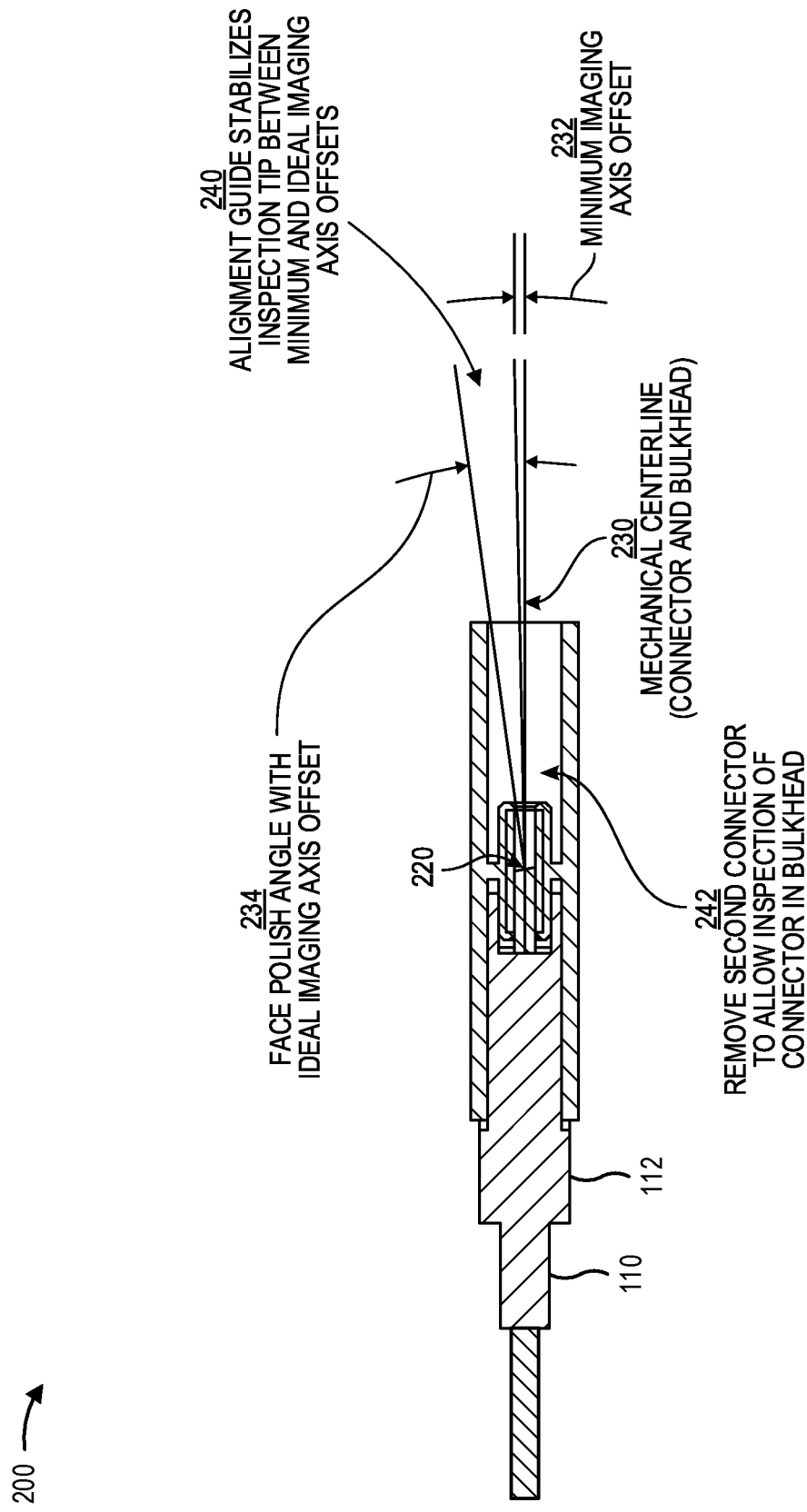

For example, FIG. 2D depicts an example cross-sectional view of the bulkhead 114 with the optical connector 112 inserted therein. As shown in FIG. 2D, reference number 230 represents a mechanical centerline of the optical connector 112 and the bulkhead 114, and reference number 232 depicts a minimum imaging axis offset at which there is likely to be sufficient lighting to obtain a high-quality image of the end face being inspected (e.g., approximately 1.25 degrees from the mechanical centerline corresponding to reference number 230). Furthermore, as shown in FIG. 2D, reference number 234 depicts a face polish angle with an ideal imaging axis offset assuming no mechanical constraints. For example, in the case of an Angled Physical Contact (APC) connector, the ideal imaging axis offset may be approximately 8.0 degrees from the mechanical centerline corresponding to reference number 230. Accordingly, as shown in FIG. 2D, and by reference number 240, the alignment guide 150 may stabilize the inspection tip 140 at an angle that satisfies a threshold value, which may be in a range between the minimum imaging axis offset and the ideal imaging axis offset. As further shown in FIG. 2D, and by reference number 242, a second connector may be removed to allow inspection of the connector 112 in the bulkhead 114. In this way, the alignment guide 150 may ensure that the inspection tip 140 is stabilized at a suitable angle relative to the end face being inspected.

As indicated above, FIGS. 2A-2D are provided merely as one or more examples. Other examples may differ from what is described with regard to FIGS. 2A-2D. In practice, there may be additional components, fewer components, different components, or differently arranged components than those shown in FIGS. 2A-2D.

Figure 3A:
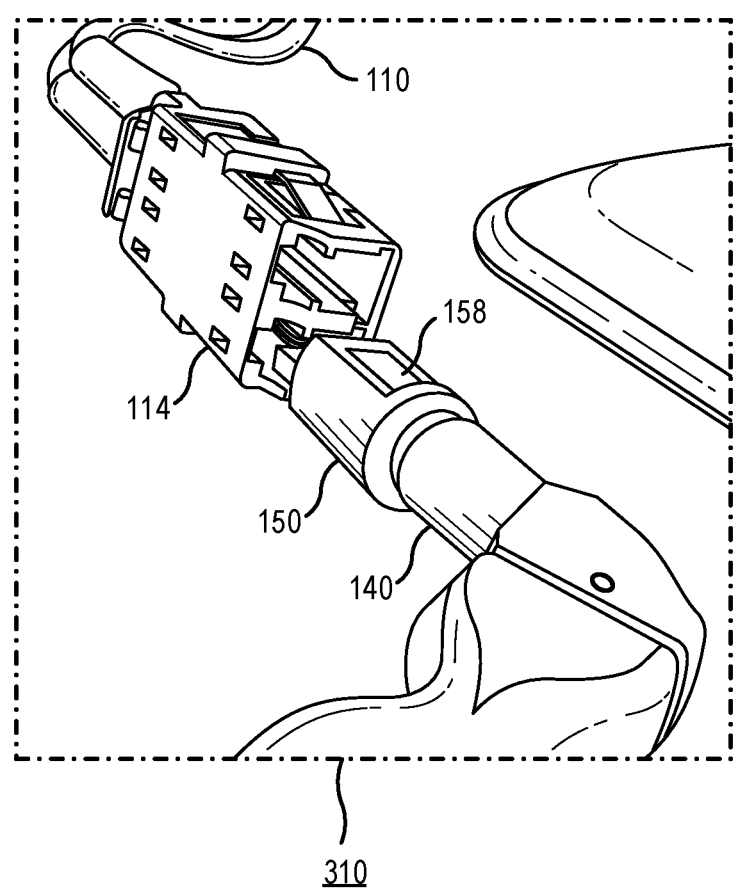
FIGS. 3A-3B are diagrams of one or more example implementations using an alignment guide described herein in an optical fiber inspection system.
Figure 3B:
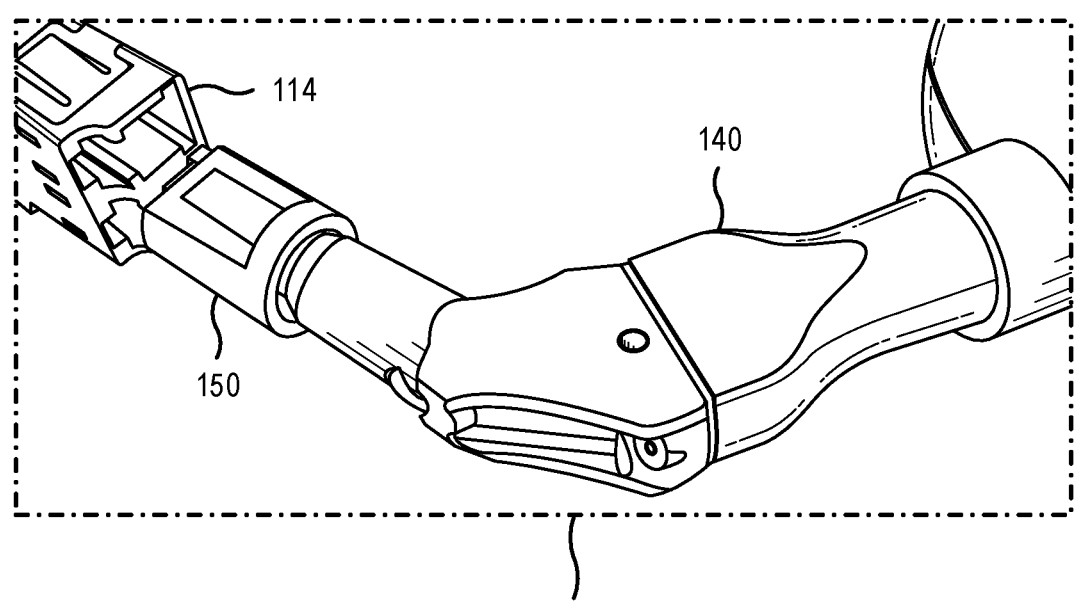

FIGS. 3A-3B are diagrams of one or more example implementations 300 using an alignment guide described herein in an optical fiber inspection system described herein. For example, as shown in FIG. 3A, the alignment guide 150 is positioned on the inspection tip 140 and the mechanical key structure 152 has been inserted into the bulkhead 114. Accordingly, as shown in FIG. 3A, and by reference number 310, the alignment guide 150 may engage the geometry of the bulkhead 114 to stabilize the inspection tip 140 and thus stabilize the image of the end face being inspected. Furthermore, the alignment guide 150 may engage the geometry of the bulkhead 114 to stabilize the inspection tip 140 at an optical offset angle that satisfies a threshold value (e.g., an angle in a range between the minimum imaging axis offset and the ideal imaging axis offset, as shown in FIG. 2D). In this way, the optical offset angle at which the inspection tip 140 is stabilized may obtain a high-quality image that satisfies imaging performance constraints while also compensating for mechanical constraints. Furthermore, in the example shown in FIG. 3A, the relief element 158 of the alignment guide 150 allows for another connector, inspection tip, and/or other objects to be inserted into or positioned near an adjacent connector of the bulkhead 114 without contacting the alignment guide 150.

As shown in FIG. 3B, and by reference number 320, the alignment guide 150 can be rotated to an alternate position that also allows the inspection tip 140 to be stabilized at a suitable angle between the minimum imaging axis offset and the ideal imaging axis offset. For example, in FIG. 3B, the alignment guide 150 has been rotated 180 degrees from the position shown in FIG. 3A. In this way, by allowing the alignment guide 150 to be rotated between different angles where the inspection tip 140 will be stabilized at a position where a high-quality image can be obtained, the alignment guide 150 may enable accurate inspection of fiber end faces even in environments where the bulkhead 114 may be mounted in a position that would otherwise impede use of the microscope 130 and the inspection tip 140.

As indicated above, FIGS. 3A-3B are provided merely as one or more examples. Other examples may differ from what is described with regard to FIGS. 3A-3B. In practice, there may be additional components, fewer components, different components, or differently arranged components than those shown in FIGS. 3A-3B.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
    a sleeve portion comprising a first opening, on a first end of the sleeve portion, and a second opening on a second end of the sleeve portion,
        wherein the first opening is arranged to be proximal to one or more optical components in an inspection device and the second opening is arranged to be distal to the one or more optical components in the inspection device when the device is removably engaged with the inspection device,
        wherein the device is removable from the inspection device based on a shaft of the inspection device being inserted through the sleeve portion; and
    a mechanical key structure adjacent to the second opening,
        wherein the mechanical key structure has a shape to engage a geometry of one or more recesses in a bulkhead and to stabilize the inspection device at an offset angle relative to an end face of an object in a field of view of the one or more optical components when the shaft of the inspection device is inserted into the bulkhead.

2. The device of claim 1, wherein the device is rotatable between a first position that stabilizes the inspection device at the offset angle relative to the end face of the object and a second position that stabilizes the inspection device at an alternate angle different from the offset angle.

3. The device of claim 1, wherein the sleeve portion and the mechanical key structure are made from one or more thermoplastic materials.

4. The device of claim 3, wherein the one or more thermoplastic materials include at least one of a polycarbonate material, an acrylonitrile butadiene styrene material, or an acrylonitrile styrene acrylate material.

5. The device of claim 1, wherein the device is to be removably engaged with the inspection device by passing the shaft of the inspection device through the first opening on the first end of the sleeve portion and engaging the mechanical key structure in a position that provides a registration with a flattened portion of the shaft.

6. The device of claim 1, further comprising:
    a visual indicator to align the shape of the mechanical key structure with the geometry of the one or more recesses in the bulkhead.

7. The device of claim 6, wherein the visual indicator is a depression formed in the sleeve portion.

8. The device of claim 1, wherein the sleeve portion includes a relief element to avoid contact between the device and one or more objects positioned in proximity to the bulkhead.

9. An inspection system, comprising:
    an alignment guide including:
        a sleeve portion comprising a first opening and a second opening to insert a shaft of an inspection device through the sleeve portion,
            wherein the alignment guide is removable from the inspection device after the shaft of the inspection device has been inserted through the sleeve portion; and
        a mechanical key structure integrated with the sleeve portion,
            wherein the mechanical key structure has a shape to engage a geometry of a bulkhead and stabilize the inspection device at an imaging axis offset angle relative to an end face of an optical fiber while the end face of the optical fiber is visible within a field of view of one or more optical components of the inspection device.

10. The inspection system of claim 9, further comprising: the inspection device,
    wherein the inspection device comprises the one or more optical components, wherein the one or more optical components are configured to capture an image of the end face of the optical fiber positioned in the bulkhead within the field of view of the one or more optical components.

11. The inspection system of claim 9, wherein the alignment guide is rotatable between a first position that stabilizes the imaging axis offset angle and a second position that stabilizes the inspection device at the imaging axis offset angle.

12. The inspection system of claim 11, wherein the imaging axis offset angle is in a range that causes the image to satisfy a set of performance constraints.

13. The inspection system of claim 9, further comprising:
a microscope to interface with the one or more optical components in the inspection device and to process the image of the end face of the optical fiber.

14. The inspection system of claim 9, wherein the alignment guide includes a visual indicator to aid in aligning the mechanical key structure with the inspection device.

15. An inspection device, comprising:
an alignment guide having a sleeve portion that includes a mechanical key structure extending outwardly from a front end of the sleeve portion,
wherein the sleeve portion comprises one or more optical components to capture an image of an end face of an optical fiber positioned in a bulkhead within a field of view of the one or more optical components,
wherein a shaft of the inspection device is removable from a device based on the sleeve portion being inserted through a sleeve of the device, and
wherein the mechanical key structure has a shape to engage a geometry of one or more recesses in the bulkhead and to stabilize the inspection device at an offset angle relative to an end face of an object in a field of view of the one or more optical components when the shaft of the inspection device is inserted into the bulkhead.

16. The inspection device of claim 15, wherein the offset angle is displaced from a mechanical centerline of the bulkhead according to an offset that satisfies a threshold value for providing sufficient lighting for capturing the image of the end face of the optical fiber in the field of view of the one or more optical component.

17. The inspection device of claim 16, wherein the alignment guide is rotatable between a first position that stabilizes the inspection device at the offset angle relative to the end face of the optical fiber and a second position that stabilizes the inspection device at an alternate angle that satisfies the threshold value.

18. The inspection device of claim 15, wherein the alignment guide is to be removably secured on the inspection device by passing the shaft through a first opening in a back end of the sleeve portion and positioning the mechanical key structure to provide a registration with a flattened portion of the shaft.

19. The inspection device of claim 15, wherein the alignment guide includes a visual indicator to align the geometry of the bulkhead.

20. The inspection device of claim 15, wherein the sleeve portion of the alignment guide includes a relief element to avoid contact between the alignment guide and one or more objects positioned adjacent to the inspection device or the alignment guide.

* * * * *